Patented Sept. 27, 1949

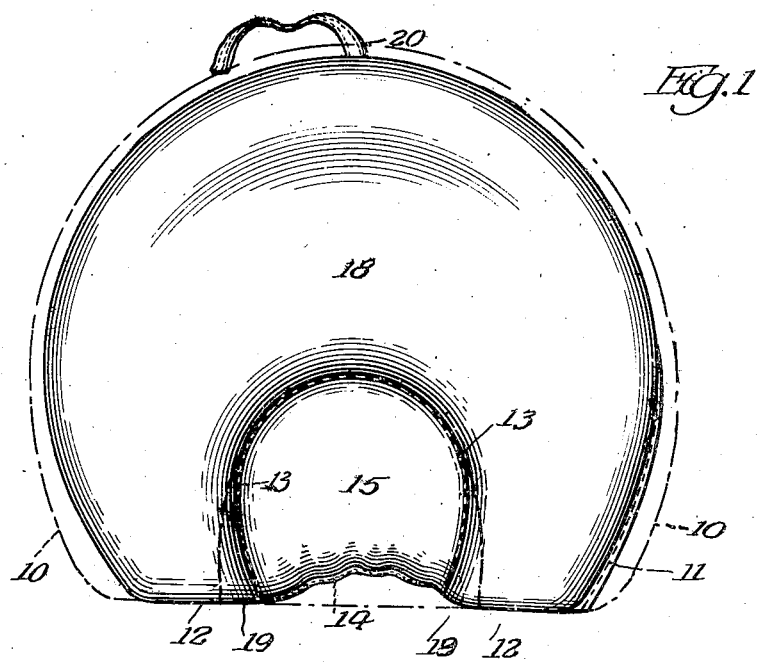
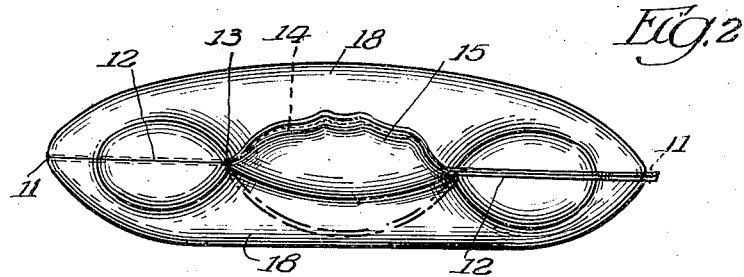
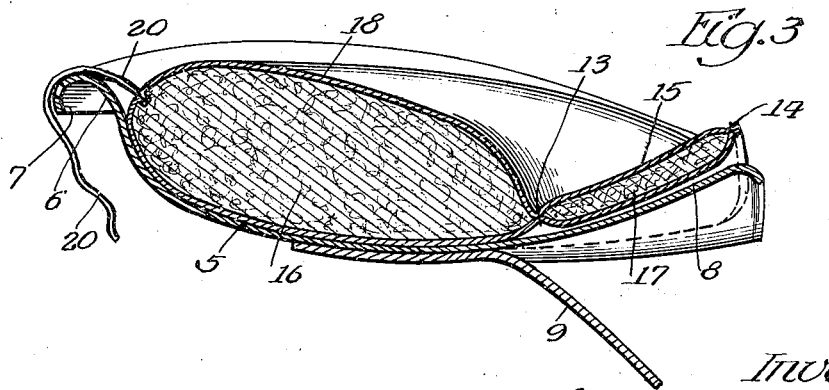

2,483,222

UNITED STATES PATENT OFFICE 2,483,222

TRACTOR SEAT CUSHION

Willard F. Moss, Chicago, Ill.

Application August 31, 1945, Serial No. 613,847

1 Claim. (Cl. 155—184)

This invention relates in general to a cushion and is more particularly described as a padded cushion for a machine seat although it may have a more general use wherever applicable.

For certain types of machines, such as tractors, harvesters and other agricultural implements, it is customary to provide a somewhat hollowed and rounded shaped seat usually of metal and frequently apertured for comfort and to prevent an accumulation of rain or other foreign material therein. Such seats usually have an upwardly projecting horn centrally located in the front edge which adds to the comfort of the seat and in holding the occupant in the seat although subjected to rough riding on the implement.

The present invention provides a well padded and rounded cushion usually covered with waterproof fabric which fits closely in such a seat so that it is not easily dislodged therefrom and has a flexible portion in the front edge to cover and overlie the machine seat horn which has materially less thickness and padding than the remaining portion of the cushion.

An important object of the invention is in the provision of a padded seat cushion for application to the projecting horn type of agricultural implement seats.

A further object of the invention is to provide a padded seat cushion having a partially enclosed portion with padding of less thickness than the remaining portion of the cushion.

A further object of the invention is to provide a padded seat cushion somewhat circular in shape with a horn covering portion at one edge thereof which is flexibly related to swing to either side of the main portion of the cushion so that it may be reversed.

A further object of the invention is to provide a seat cushion formed of sheet material having a horn covering portion substantially enclosed by a more padded portion in which the padding tends to release the horn covering portion for free flexible movement in either direction with respect to the remainder of the cushion.

Still a further object of the invention is to provide a reversible cushion of the horn covering type made of similar sheets of material secured about their edges and substantially enclosing a horn covering portion which has less padding than the remainder of the cushion and arranged at one edge thereof so that the padding in the remainder of the cushion tends to draw inwardly at the sides of the horn covering portion.

Other objects of the invention will appear in the specification and will be apparent from the accompanying drawings forming a part thereof. In the drawings:

Figure 1 is a plan view of the seat cushion in accordance with this invention;

Figure 2 is a front view of the cushion shown in Figure 1; and

Figure 3 is a sectional view of the cushion in accordance with this invention as applied to an agricultural implement seat.

Even though the seats of agricultural and other implements are now spring mounted, rounded and shaped to provide the greatest comfort, and of metal for all weather, the seat becomes pretty hard and uncomfortable after long continued use unless a suitable cushion or padding is provided. The usual pad, or cushion does not adequately provide for the projection of the machine seat horn at the front of the seat, and it is not only uncomfortable but also is not retained firmly in place.

The present invention overcomes these objections by providing a reversible cushion which is shaped to fit an agricultural implement type of seat, to provide a well padded cushion therefor and also to provide a less padded cover for the horn of the seat which is made flexible by the shape of the cushion itself so that it readily assumes a loose position to cover the horn regardless of which side of the cushion is uppermost.

Referring now more particularly to the drawings, this invention is shown and described as used in connection with the machine implement type of seat 5, having an upwardly rounded outer rim 6 with a downwardly projecting flange 7 except that in front thereof an upwardly inclined horn 8 is provided which tends to hold a person therein even during rough riding. Such seats are usually mounted upon a spring arm 9 securely fixed thereto and to some suitable support on the machine.

The cushion of the present invention is designed and intended to be applied to a machine seat of this kind and comprises flexible fabric covers usually formed of two flat sheet blanks as shown by the broken outline 10 made of rubberized, waterproof or weather resistant fabric material usually stitched about the edges 11.

The cushion blanks are somewhat circular in shape except along one edge 12 where an inward rounded row of stitching 13 is provided, centrally located with respect to the straight or forward edge. This circular row of stitching 13 and outer row of stitching 14 define a flap 15 which is substantially enclosed by the remainder of the cushion except along the outer edge 12.

In making the cushion, the seams 11 for most of the outside stitching are turned inwardly, but at one portion of the cushion where the padding is applied thereto, the stitching is on the outside in accordance with well established practices.

A thick mass of padding 16 is applied to the main outer portion of the cushion causing the sides to bulge outwardly and usually evenly from the outer line of stitching 11, and at the inside of the flap 15 is a thin layer or mass of padding 17 which is substantially uniform in thickness and does not vary or round outwardly from the stitched edges as in the main portion of the seat 18.

From this it will be observed that the outer or main portion of the cushion is substantially crescent shaped, the sides bulging outwardly, and because of the outwardly bulging sides, the outside edges of the sheets 18—18 are drawn inwardly as indicated by the difference between the dotted and full line outlines of the cushion as shown in Figure 1 and the inner edges along the line of stitching 13 are also drawn in as indicated at 19. This causes a surplus of material along the edge of the flap 15 which allows it to flex readily in either direction since the inner extremities 19 of the crescent are permanently drawn inwardly by reason of the padding applied thereto.

This construction makes the horn covering pad freely and loosely flexible in either direction so that the cushion is readily replaced in position in the seat 5, the flap forming an integral and unitary part with the remainder of the seat and accommodating itself to the shape of the horn regardless of which side of the cushion is uppermost.

Extending outwardly from the rear edge of the seat is a fastening strap 20 preferably sewed in place between the outer covers which form the seat and made of suitable length of the same or different material so that it can be tied to the seat 5 or to some other suitable support for holding the cushion in place.

By making this cushion of rubberized fabric or some similar material, the cushion is substantially waterproof and is not easily damaged if left in the seat and subjected to the weather. It provides a fully stuffed outwardly bulging soft cushion in the places where seat padding is most greatly required, and at the same time provides a flexible flap for the horn projection of the seat where it is not so much required. Even though the main portion of the padding does become more compact upon continued usage, the main portion of the cushion projects beyond the horn of the seat so that the horn offers no obstruction to the comfort afforded by the cushion.

Although a preferred embodiment of the invention is thus shown and described in connection with an implement seat, it is to be understood that it may have a more general application and use and is not limited to the precise construction as shown which is merely illustrative of the principles of the invention.

What I consider new and desire to secure is:

A reversible seat cushion comprising two substantially similar flexible sheets stitched together along their periphery, an inwardly extending arcuate line of stitching further securing the two sheets together and extending from two points at the front of the sheets that are equally spaced on opposite sides of the center of the cushion, said arcuate line of stitching extending inwardly from the front edge of the sheets an amount less than half of the effective width of the sheets and forming a front flap, padding separating the sheets between the inner arcuate line of stitching and the encompassing perimeter of the sheets, and a lesser amount of padding separating the sheets at said flap portion, said lesser amount of padding being of a maximum thickness less than half the maximum thickness of the first mentioned padding, the area of the material of the front flap being greater than the area of the space embraced by the arcuate line of stitching of the padded cushion whereby the flap as a unit may be freely bulged upwardly or downwardly while leaving in their normal positions the portions of the front of the cushion that are on opposite outer sides of the arcuate line of stitching.

WILLARD F. MOSS.

REFERENCES CITED

The following references are of record in the file of this patent:

UNITED STATES PATENTS

| Number | Name | Date |
|---|---|---|
| 484,367 | Hicks | Oct. 11, 1892 |
| 1,468,072 | Ogle | Sept. 18, 1923 |
| 1,512,260 | Wilson | Oct. 21, 1924 |
| 1,580,210 | McCulloch | Apr. 13, 1926 |
| 1,583,455 | Griffin | May 4, 1926 |
| 2,199,047 | Fisher | Apr. 30, 1940 |
| 2,199,479 | Cappel | May 7, 1940 |
| 2,208,745 | Bloomberg | July 23, 1940 |

FOREIGN PATENTS

| Number | Country | Date |
|---|---|---|
| 411,712 | Great Britain | June 14, 1934 |